United States Patent
Imada

(10) Patent No.: US 8,027,578 B2
(45) Date of Patent: Sep. 27, 2011

(54) OPTICAL APPARATUS INCLUDING IMAGE BLUR CORRECTION DEVICE

(75) Inventor: Shinji Imada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 12/247,787

(22) Filed: Oct. 8, 2008

(65) Prior Publication Data

US 2009/0097833 A1   Apr. 16, 2009

(30) Foreign Application Priority Data

Oct. 15, 2007   (JP) .................. 2007-267996

(51) Int. Cl.
G03B 17/00   (2006.01)

(52) U.S. Cl. ............... 396/55; 348/208.11; 359/557

(58) Field of Classification Search ............ 348/208.16, 348/208.11; 396/55; 359/557
See application file for complete search history.

(56) References Cited

U.S. PATENT DOCUMENTS

| | | | |
|---|---|---|---|
| 5,175,580 A | | 12/1992 | Shiomi |
| 5,398,132 A | | 3/1995 | Otani |
| 5,585,875 A | * | 12/1996 | Imafuji et al. ........... 396/55 |
| 5,619,293 A | * | 4/1997 | Usui ................. 396/55 |
| 5,659,807 A | * | 8/1997 | Nakamura et al. .......... 396/55 |
| 5,732,291 A | * | 3/1998 | Ohishi .............. 396/55 |
| 5,761,546 A | * | 6/1998 | Imada ............... 396/55 |
| 5,852,749 A | * | 12/1998 | Konno et al. ............. 396/55 |
| 2003/0147636 A1 | * | 8/2003 | Yamazaki ............. 396/55 |
| 2007/0065129 A1 | | 3/2007 | Shiratori |
| 2007/0122134 A1 | * | 5/2007 | Suzuki ............. 396/55 |

FOREIGN PATENT DOCUMENTS

| | | |
|---|---|---|
| CN | 1892293 A | 1/2007 |
| EP | 1814318 A2 | 8/2007 |
| JP | 7-218967 A | 8/1995 |
| JP | 8-184870 A | 7/1996 |
| JP | 2005-115253 A | 4/2005 |

OTHER PUBLICATIONS

Translation of JP Publication No. 06-003724; Inventor: Takagishi, Hiroaki; Title: Camera; Publication Date: Jan. 14, 1994.*

* cited by examiner

Primary Examiner — Rodney Fuller
Assistant Examiner — Fang-Chi Chang
(74) Attorney, Agent, or Firm — Canon USA, Inc. IP Division

(57) ABSTRACT

An optical apparatus includes a shake detection unit to detect shaking applied to a camera; an image blur correction driving unit for driving a lens and correcting image blur caused by the shaking; and a selection unit configured to select whether correction of image blur is to be permitted or inhibited. If image blur correction is permitted, the image blur correction driving unit operates in accordance with a first driving characteristic. If image blur correction is inhibited, the image blur correction driving unit holds the lens near an optical axis in accordance with a second driving characteristic.

5 Claims, 10 Drawing Sheets

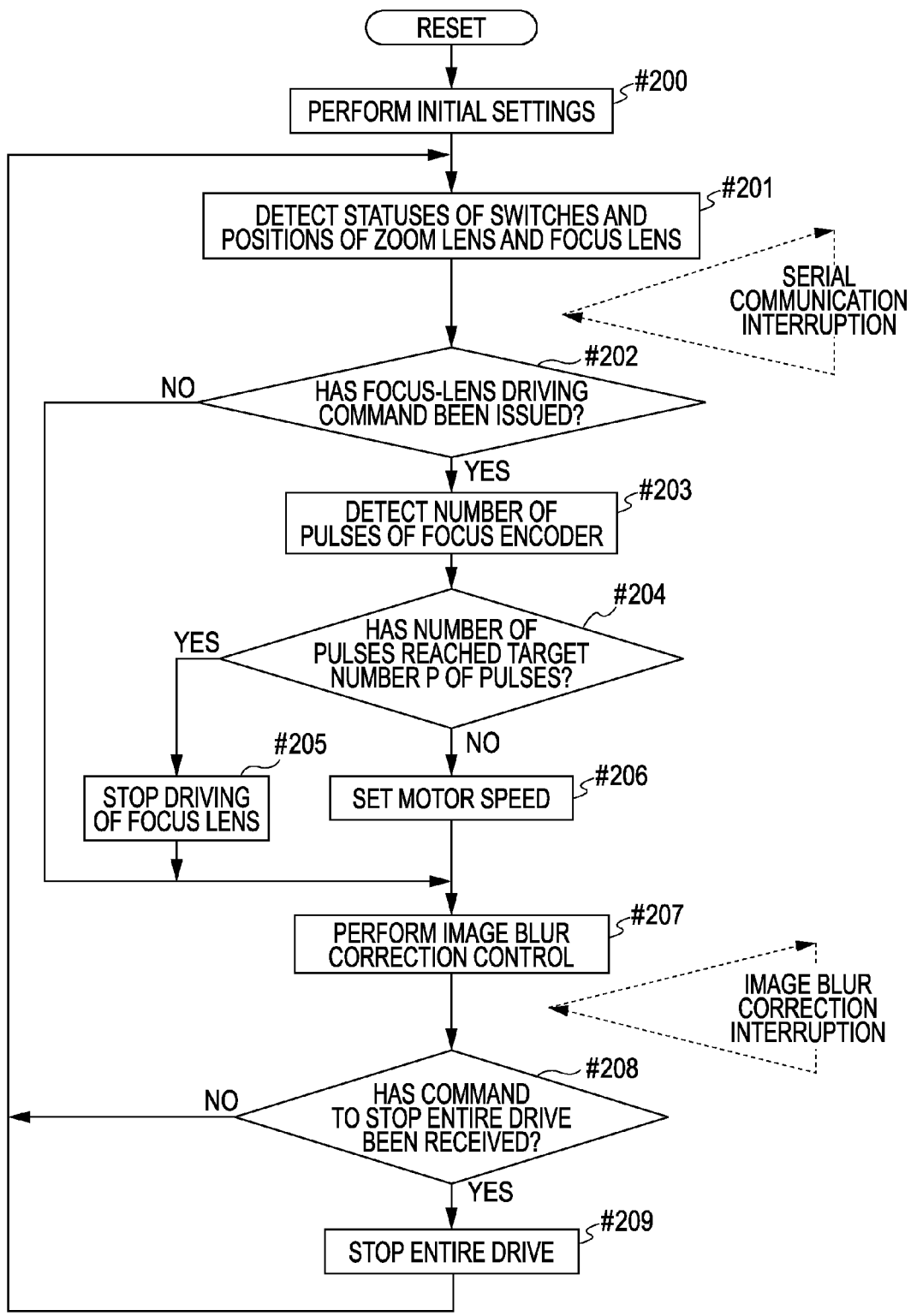

OPTICAL APPARATUS INCLUDING IMAGE BLUR CORRECTION DEVICE

BACKGROUND OF THE INVENTION

1. Field of the Invention

The present invention relates to a lens including an image blur correction device configured to detect camera shake caused by holding a camera by hand, and to correct the detected camera shake so that the quality of a captured image can be improved. The present invention also relates to a camera, to an optical apparatus including a camera system including the lens and the camera, and to photographing equipment.

2. Description of the Related Art

In the case of recent cameras, all the important operations for shooting, such as exposure control and focus adjustment, can be automated. Thus, even photographers who have little experience in performing camera operations rarely make mistakes in taking photographs.

In addition, since optical apparatuses including a camera and a lens and provided with an image blur correction device (configured to reduce camera shake caused by holding a camera by hand) have been widely used, shooting mistakes caused by photographers rarely occur.

An image blur correction system will be briefly described.

Normally, camera shake caused by hand shake occurring at the time of shooting is a vibration having a frequency in a range from about 1 Hz to about 12 Hz.

In order to reduce the influence of image blur caused by the camera shake, a so-called optical image stabilization system for detecting the camera shake and displacing a correction lens in accordance with a result of the detection has been proposed.

In order to improve the performance of an image-blur correction device, it is necessary, first, to accurately detect shaking of a camera and, second, to properly correct displacement of an optical axis caused by the camera shake.

Such vibration (that is, camera shake caused by hand shake) is detected using a shake detection unit configured to detect angular acceleration, angular velocity, angular displacement, and the like.

Signals output from the shake detection unit are integrated, and an angular displacement signal is calculated. On the basis of the obtained angular displacement signal, the photographing optical axis is made to be off-center, to correct image blurring.

An overview of an image stabilization system including such a shake detection unit will be described with reference to FIG. 9.

FIG. 9 shows an example of a system for suppressing image blur caused by vertical camera shake $81p$ and horizontal camera shake $81y$, which are indicated by arrows 81. In the example shown in FIG. 9, an image blur correction device is provided in an interchangeable lens of a single-lens reflex camera.

Referring to FIG. 9, the system includes a lens barrel 82, a vertical camera shake detection unit $83p$, and a horizontal camera shake detection unit $83y$. The vertical camera shake detection unit $83p$ and the horizontal camera shake detection unit $83y$ detect shake in directions denoted by $84p$ and $84y$, respectively.

The system also includes a correction optical device 85. The correction optical device 85 includes coils $86p$ and $86y$ for applying driving force to the correction optical device 85 and position detecting elements $87p$ and $87y$ for detecting the position of the correction optical device 85. A position control loop provided in the correction optical device 85 is driven in accordance with outputs of the shake detection units $83p$ and $83y$ as set points. Accordingly, stabilization in an image plane 88 can be ensured.

In addition, an image blur correction device described in Japanese Patent Laid-Open No. 7-218967 includes a mechanical mechanism for mechanically holding a correction optical system at the center of correction when the correction optical system is not driven.

An image blur correction device in which a correction optical system is held at the center of correction by using elastic members, such as springs, instead of using the mechanical mechanism, is also available. Since such an image blur correction device does not include a mechanical holding unit, a small-size image blur correction device can be achieved.

In a shake correction device described in Japanese Patent Laid-Open No. 8-184870, when an image blur correction operation is not performed, a correction lens is held by springs. Thus, when a shock is applied to the springs, the springs resonate at resonance frequencies. Depending on the spring constant of a spring, the resonance amplitude may significantly increase.

In the case of shooting with a single-lens reflex camera, mirror driving and shutter driving are performed at the time of shooting. In the case that a shock caused by such driving is applied to the above-described image blur correction device, the correction lens can resonate. This resonance may affect a captured image.

In order to avoid such an unwanted resonance, electric power is supplied to driving coils so that the correction lens can be electrically held so as to be centrally aligned with the optical axis. The correction lens may be held in the vicinity of the optical axis to an extent that allows the influence to be exerted on a captured image to become negligible.

In order to attenuate an unwanted resonance more effectively, the correction lens must be electrically held in accordance with a driving characteristic having an increased damping. However, in the case of a characteristic having an increased damping, the phase lag in image blur correction increases and the performance of image blur correction is thus degraded.

FIGS. 10A and 10B are Bode diagrams each representing a difference in frequency characteristic with respect to a difference in damping. In each of FIGS. 10A and 10B, a characteristic represented by a solid line is a frequency characteristic in the case of a low damping and a characteristic represented by a dotted line is a frequency characteristic in the case of a high damping.

As is clear from the gain characteristic represented by the solid line shown in FIG. 10A, a large resonance gain is indicated at the resonance frequency. Thus, in the case that a vibration at the resonance frequency is input into the image blur correction device, the correction lens largely resonates. Thus, such a large resonance may affect a captured image.

In the case that the damping is increased in order to achieve a smaller resonance gain, the characteristic represented by the dotted line can be achieved. However, a large phase lag is generated at a hand-shake frequency range around 10 Hz. As a result, the performance of image blur correction is degraded.

In addition, unwanted resonance caused by the above-mentioned shock is attenuated with time. Thus, in the case where the shutter speed of a camera is fast, a large influence of unwanted resonance is exerted on a captured image. On the other hand, in the case where the shutter speed is slow, a small influence of unwanted resonance is exerted on a captured image.

SUMMARY OF THE INVENTION

The present invention can reduce the influence of resonance of a correction lens, which is caused by an operation of a component member during a shooting operation.

The present invention also can achieve optimal image blur correction control corresponding to a shutter speed since the influence of resonance of the correction lens to be exerted on a shooting result differs depending on the shutter speed.

An optical apparatus according to an aspect of the present invention including a camera system including a lens and a camera includes a shake detection unit configured to detect shaking; an image blur correction driving unit configured to drive the lens on the basis of a result of the detection performed by the shake detection unit and configured to correct image blur caused by the shaking; and a selection unit configured to allow selection of whether performance of image blur correction by the image blur correction driving unit is to be permitted or inhibited. If image blur correction is permitted, the image blur correction driving unit performs image blur correction on the basis of an output from the shake detection unit, in accordance with a first driving characteristic. If image blur correction is inhibited, the image blur correction driving unit holds the lens at a position aligned with an optical axis in accordance with a second driving characteristic.

According to an aspect of the present invention, by changing the driving characteristic of the correction lens in accordance with a determination of whether an image blur correction operation is to be permitted, an unwanted resonance of the correction lens can be reduced without degrading the efficiency in image blur correction in a case where an image blur correction operation is selected. In addition, in a case where an image blur correction operation is not selected, an unwanted resonance of the correction lens can be reduced.

In addition, according to an aspect of the present invention, by changing the driving characteristic of the correction lens in accordance with a determination of whether an image blur correction operation is to be permitted and in accordance with the shutter speed, an unwanted resonance of the correction lens can be reduced without degrading the efficiency in image blur correction.

Further features of the present invention will become apparent from the following description of exemplary embodiments with reference to the attached drawings.

BRIEF DESCRIPTION OF THE DRAWINGS

FIG. 5 is a flowchart showing a process performed by an interchangeable lens according to the embodiment of the present invention.

DESCRIPTION OF THE EMBODIMENTS

Embodiments of the present invention will now be described with reference to the drawings.

First Embodiment

Figure 1:
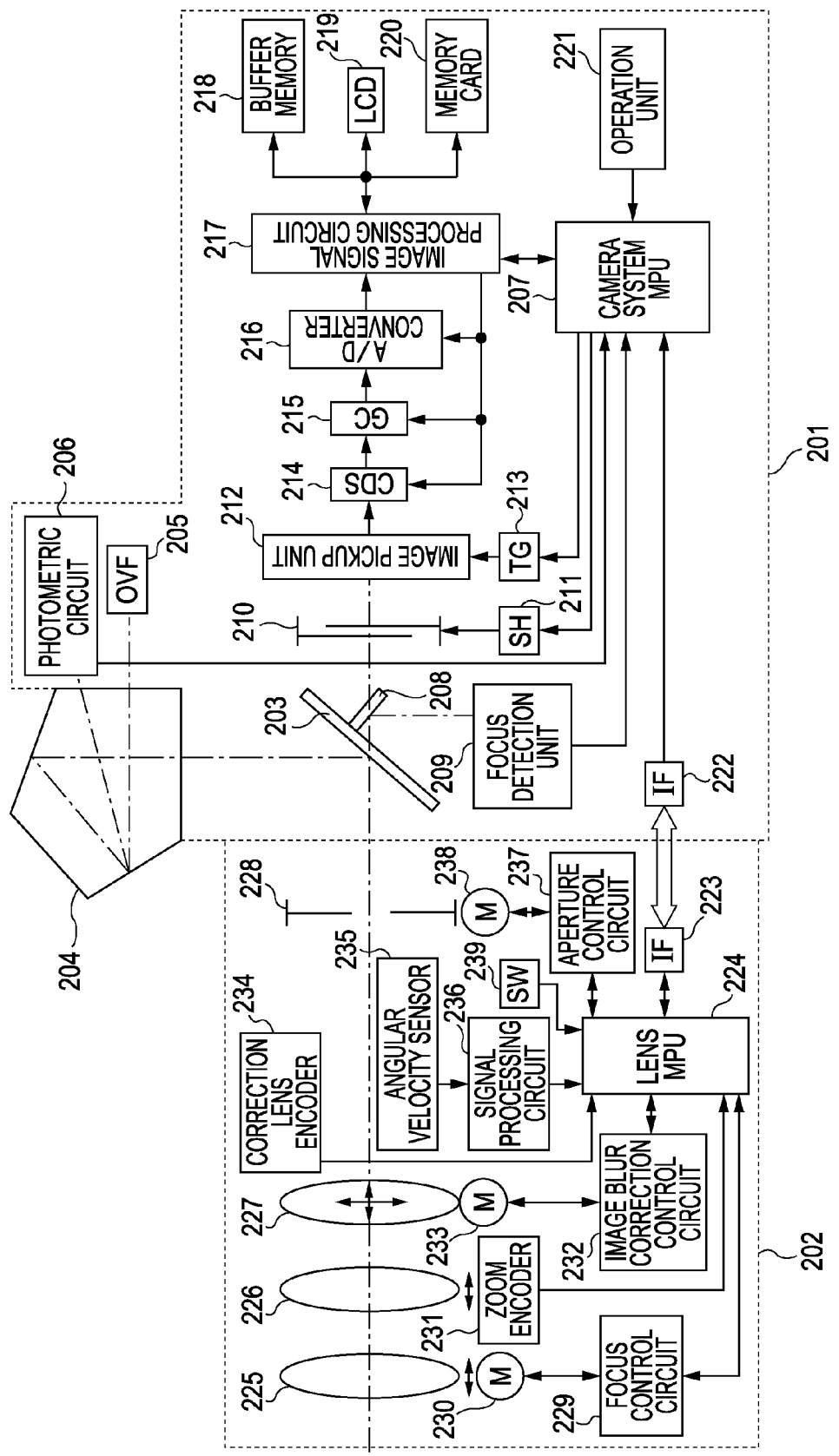
FIG. 1 is a block diagram showing an example of the configuration of a camera system according to an embodiment of the present invention.

FIG. 1 shows an example of the configuration of a camera system (optical apparatus) according to an embodiment of the present invention. The camera system includes a camera main body 201 and an interchangeable lens 202.

Light from an object passes through a photographing optical system of the interchangeable lens 202. Part of the light is reflected by a quick-return main mirror 203, a central portion of which functions as a half mirror in a shooting standby mode, to form an erect image via a pentaprism 204.

A photographer is able to confirm the erect image as an object image through an optical view finder 205.

A photometric circuit 206 measures the illuminance on a focusing screen (not shown) and outputs a result of the measurement to a camera system control microprocessing unit (MPU) 207.

The camera system control MPU 207 determines photographing conditions, such as an exposure time and an aperture. A photometric sensor provided in the photometric circuit 206 is divided into a plurality of areas and obtains a photometric result for each of the plurality of areas.

A sub-mirror 208 is disposed at the rear of the quick-return main mirror 203. The sub-mirror 208 allows light flux passing through a half-mirror plane of the quick-return main mirror 203 to be incident to a focus detection unit 209.

The focus detection unit 209 performs photoelectric conversion and signal processing on the incident light to obtain focus detection data. The focus detection unit 209 outputs the obtained focus detection data to the camera system control MPU 207.

When a shooting operation starts, the quick-return main mirror 203 and the sub-mirror 208 move away from the optical axis toward the pentaprism 204, and a focal plane shutter 210 is driven by a shutter driving circuit 211.

Thus, light is formed as a photographing optical image on a plane of an image pickup unit (including a charge-coupled device (CCD) or a complementary metal-oxide semiconductor (CMOS) device) 212. The photographing optical image is photoelectrically converted, by the image pickup unit 212, into an image pickup signal.

A timing generator (TG) 213 controls a storing operation, a reading operation, and a reset operation of the image pickup unit 212. A correlated double sampling (CDS) circuit 214 reduces charge noise stored in the image pickup unit 212. A gain control circuit 215 amplifies an image pickup signal. An analog-to-digital (A/D) converter 216 converts the amplified image pickup signal, which is an analog signal, into digital image data.

An image signal processing circuit 217 performs filter processing, color conversion processing, and gamma processing on the digital image data obtained by the A/D converter 216.

The image signal that has been subjected to signal processing by the image signal processing circuit 217 is stored in a buffer memory 218 and is used for indication on a liquid crystal display (LCD) 219. In addition, the processed image signal is recorded in a storage medium such as a removable memory card 220.

An operation unit 221 includes a camera main switch and other user-operable switches for allowing a shooting mode to be set, allowing the size of a recording image file to be set, and allowing a shutter release to be activated at the time of shooting.

In addition to the control of the above-described operations, the camera system control MPU 207 performs communication with a lens MPU 224 via an interface circuit 222 of the camera main body 201 and an interface circuit 223 of the interchangeable lens 202.

In such communication, the camera system control MPU 207 transmits a focus lens driving command to the interchangeable lens 202. The camera system control MPU 207 also transmits and receives data regarding the operation statuses and optical information of the camera main body 201 and the interchangeable lens 202 to and from the interchangeable lens 202.

The interchangeable lens 202 includes, as part of the photographing optical system, a focus lens 225, a zoom lens 226, an image blur correction lens 227, and an aperture 228.

The focus lens 225 is driven, via a focus control circuit 229 and a focus-lens driving motor 230, in accordance with a control signal transmitted from the lens MPU 224.

The focus control circuit 229 includes a focus lens driving circuit, a focus encoder for outputting a zone pattern signal and a pulse signal corresponding to movement of the focus lens 225, and the like. The focus encoder is capable of detecting the distance to an object.

The zoom lens 226 is moved in response to an operation of a photographer to move a zoom operation ring (not shown). A zoom encoder 231 outputs a zone signal corresponding to movement of the zoom lens 226.

The image blur correction lens 227 is driven via an image blur correction control circuit (image stabilization (IS) control circuit) 232 and a linear motor 233.

Image blur correction is performed as described below. That is, an angular velocity sensor 235 configured to detect rotational shake outputs a shake signal to a signal processing circuit 236. The signal processing circuit 236 performs signal processing on the shake signal and outputs the processed signal to the lens MPU 224. The lens MPU 224 calculates a correction lens driving target signal, and outputs, to the image blur correction control circuit 232, a driving signal corresponding to a difference between the obtained correction lens driving target signal and a correction lens positional signal output from a correction lens encoder 234. Image blur correction is performed by feeding back, to the image blur correction control circuit 232, the correction lens positional signal output from the correction lens encoder 234.

The aperture 228 is driven by a stepping motor 238 via an aperture control circuit 237 in accordance with a control signal supplied from the lens MPU 224.

An image blur correction ON/OFF switch 239 is a switch for allowing selection of whether performance of image blur correction is to be permitted or inhibited.

An image blur correction device including the image blur correction lens 227 will be described with reference to FIG. 2, FIGS. 3A and 3B, and FIGS. 4A and 4B.

Figure 2:
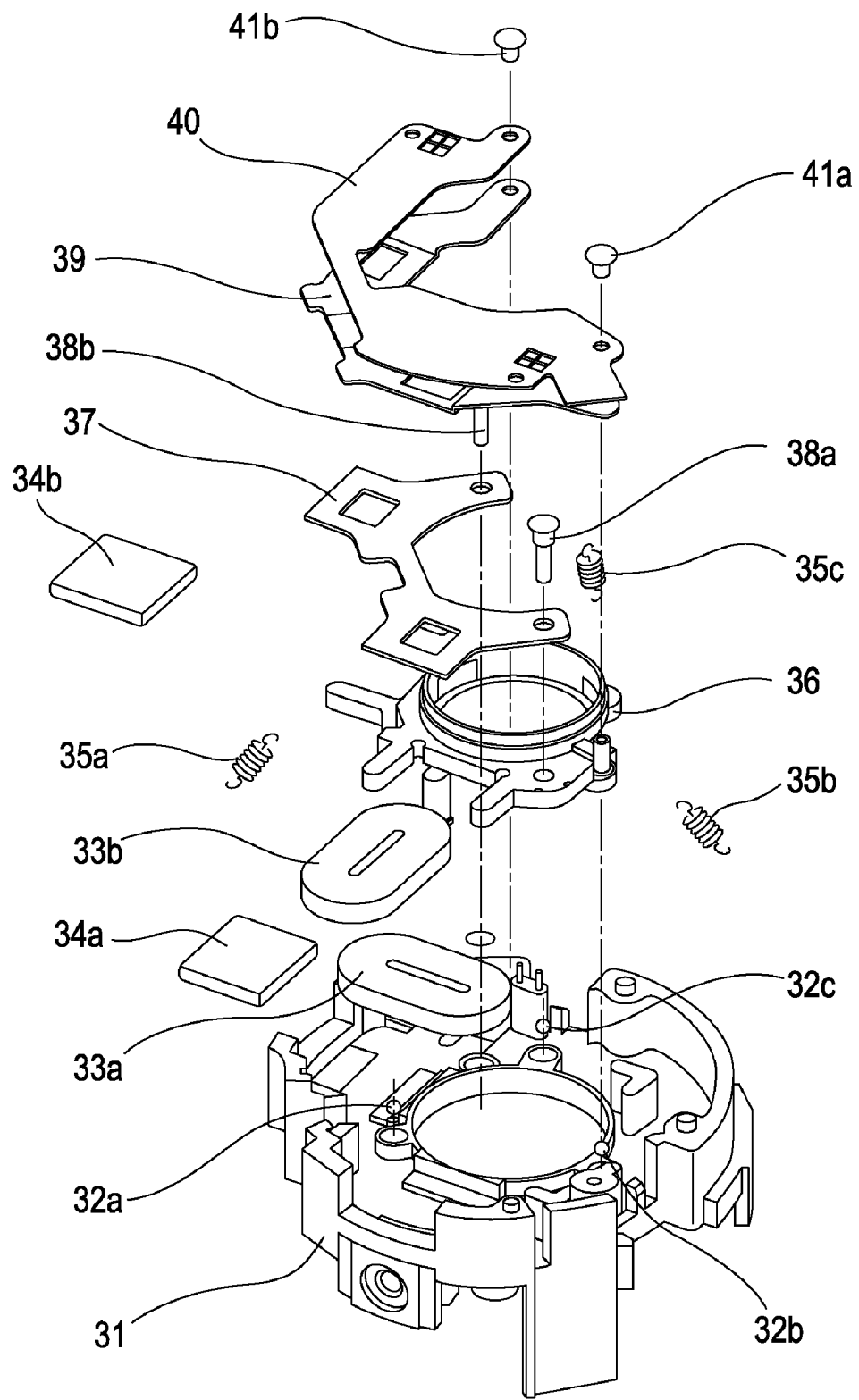
FIG. 2 is an exploded perspective view of an image blur correction device according to the embodiment of the present invention.

FIG. 2 is an exploded perspective view showing a lens driving device.

Referring to FIG. 2, balls 32*a*, 32*b*, and 32*c* are sandwiched between a base plate 31 and a movable lens barrel 36. In addition, in FIG. 2, reference numerals 33*a* and 33*b* denote coils, reference numerals 34*a* and 34*b* denote magnets, reference numerals 35*a*, 35*b*, and 35*c* denote elastic members, and reference numeral 37 denotes a magnet attracting plate having holes. In addition, reference numerals 38*a* and 38*b* denote magnet-attracting-plate fixing screws, reference numeral 39 denotes a movable-lens-barrel holding plate, reference numeral 40 denotes a flexible printed circuit (FPC), and reference numerals 41*a* and 41*b* denote FPC fixing screws.

Figure 3A:
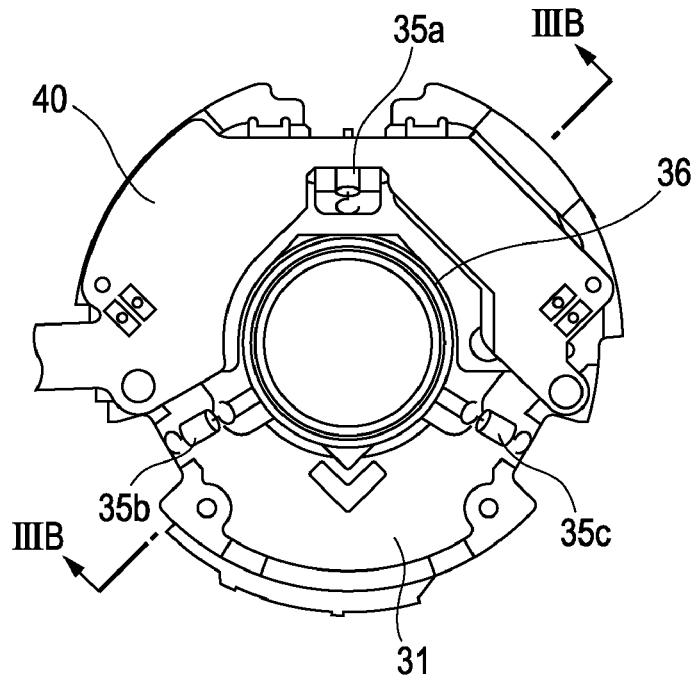
FIG. 3A is a plan view of the image blur correction device according to the embodiment of the present invention.
Figure 3B:
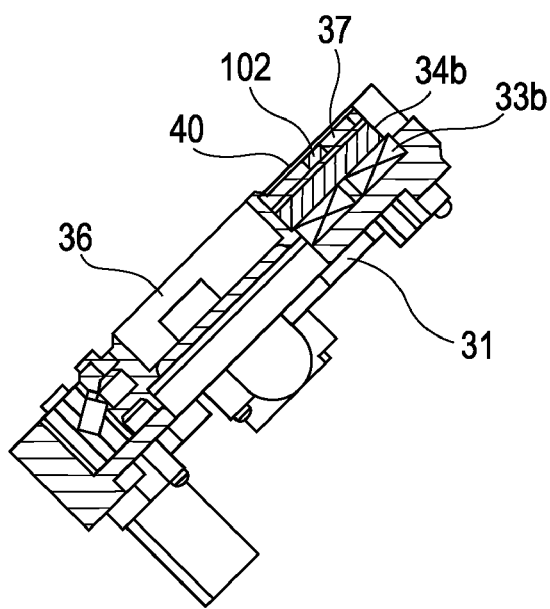
FIG. 3B is a sectional view of the image blur correction device according to the embodiment of the present invention.

FIGS. 3A and 3B are plan views of the lens driving device. FIG. 3A is a front view of the lens driving device when viewed from an optical axis direction. FIG. 3B is a sectional view of the lens driving device taken along line IIIB and IIIB of FIG. 3A.

As shown in FIG. 3A, the movable lens barrel 36 is elastically supported with respect to the base plate 31 by the elastic members 35*a*, 35*b*, and 35*c*. In this embodiment, the three elastic members 35*a*, 35*b*, and 35*c* are radially arranged with 120-degree intervals around the optical axis. With such a symmetrical arrangement, excitation of an unwanted resonance caused by occurrence of moment can be suppressed. In addition, the elastic members 35*a*, 35*b*, and 35*c* are mounted at a slant in an optical axis direction in an appropriate manner. The elastic members 35*a*, 35*b*, and 35*c* hold the balls 32*a*, 32*b*, and 32*c* (see FIG. 2), which are arranged between the base plate 31 and the movable lens barrel 36.

As shown in FIG. 3B, the coil 33*a* (see FIG. 2) and the coil 33*b* are fixed at the base plate 31, and the magnet 34*a* (see FIG. 2) and the magnet 34*b* are fixed at the movable lens barrel 36. The coils 33*a* and 33*b* and the magnets 34*a* and 34*b* constitute a moving-magnet actuator.

A sensor 102 is provided in a portion opposite to the coils 33*a* and 33*b* so as to face the magnet 34*a*. In this embodiment, since a moving-magnet actuator is provided, a Hall element is used as a sensor used for position detection. The sensor 102 is fixed at the base plate 31 with the FPC 40 therebetween. The sensor 102 detects the position of the movable lens barrel 36 by detecting a change in the magnetic flux density. In addition, with the above-described arrangement of the Hall element, the magnet 34*a* for driving can also be used as a magnet for position detection.

Figure 4A:
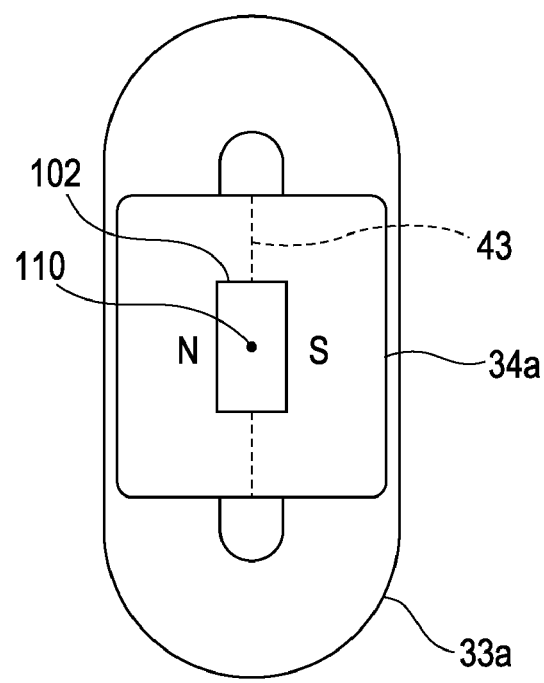
FIGS. 4A and 4B are explanatory diagrams showing a driving unit of the image blur correction device according to the embodiment of the present invention.
Figure 4B:
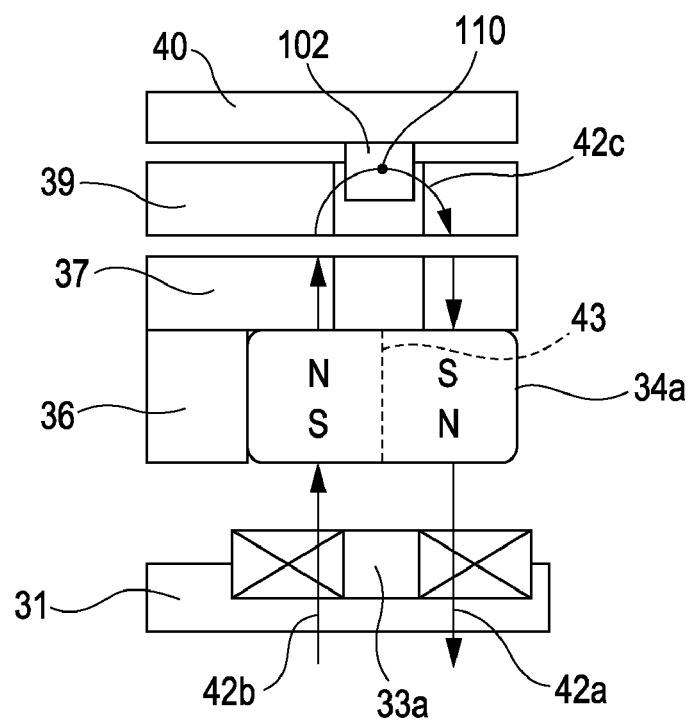

FIGS. 4A and 4B are schematic views of a driving unit. FIG. 4A shows the driving unit when the magnet 34*a*, the coil 33*a*, and the sensor 102 are viewed from the optical axis direction. FIG. 4B is a sectional view of the driving unit taken along the line in the vicinity of the center of the magnet 34*a*. In FIGS. 4A and 4B, reference numeral 110 denotes a magnetic sensing point of the sensor 102.

In the magnetic circuit shown in FIG. 4B, magnetic flux lines 42*a*, 42*b*, and 42*c* flow as indicated by arrows shown in FIG. 4B. In the state shown in FIG. 4B, since the magnetic sensing point 110 is located immediately above a magnetization boundary 43, the magnetic field at this point is about zero. The amount of movement of the magnetic field in this state is detected as zero. In a case where a relative motion occurs between the base plate 31 and the movable lens barrel 36, the magnetization boundary 43 moves together with the movable lens barrel 36 when viewed from the sensor 102 fixed at the base plate 31. Thus, in this case, the magnetic field at the magnetic sensing point 110 is not zero. A linear relationship is maintained between the amount of movement and the intensity of the magnetic field within a certain range. In this range, the position can be detected in a linear manner.

Processes to be performed by the interchangeable lens 202 will be described with reference to flowcharts shown in FIGS. 5, 6, and 7.

When the interchangeable lens 202 is attached to the camera main body 201, the camera main body 201 starts serial communication with respect to the interchangeable lens 202, and a process starts in step #200 of the flowchart shown in FIG. 5.

In step #200, initial settings for lens control, image blur correction control, and the like are performed.

In step #201, the statuses of switches (not shown) and the positions of the zoom lens 226 and the focus lens 225 are detected. The switches includes, for example, a switch for allowing selection between autofocus and manual focus and an image blur correction ON/OFF switch 239 for allowing selection of whether image blur correction function is to be activated.

In step #202, it is determined whether a focus-lens driving command has been issued from the camera main body 201. If it is determined that a focus-lens driving command has been received, the process proceeds to step #203. If it is determined that a focus-lens driving command has not been received, the process proceeds to step #207.

The focus-lens driving command transmitted from the camera main body 201 includes information on a target amount of driving (that is, a target number P of pulses) of the focus lens 225. In step #203, the number of pulses of the focus encoder provided in the focus control circuit 229 is detected, and driving control of the focus lens 225 is performed so that the focus lens 225 can be driven by the target number P of pulses.

In step #204, it is determined whether the current number of pulses has reached the target number P of pulses. If it is determined that the current number of pulses has reached the target number P of pulses, the process proceeds to step #205. If it is determined that the current number of pulses has not reached the target number P of pulses, the process proceeds to step #206.

In step #205, since the current number of pulses has reached the target number P of pulses, the driving of the focus lens 225 is stopped.

In step #206, since the current number of pulses has not reached the target number P of pulses, the speed of the focus-lens driving motor 230 is set in accordance with the remaining number of driving pulses. The speed of the focus-lens driving motor 230 decreases as the remaining number of driving pulses decreases.

In step #207, image blur correction control is performed. More specifically, if turning off of the image blur correction ON/OFF switch 239 is detected in step #201, the image blur correction lens 227 is stopped at a position in the vicinity of the optical axis. On the other hand, if turning on of the image blur correction ON/OFF switch 239 is detected and "SW1 ON" regarding a release switch of the camera main body 201 is detected in accordance with camera lens status communication in step #201, a mode in which an image blur correction operation is enabled is set.

In step #208, it is determined whether a command to stop the entire drive (to stop the entire drive of the actuator in the interchangeable lens 202) has been received from the camera main body 201. In the case where the camera main body 201 has not performed any operation for a certain period of time, the camera main body 201 transmits the command to stop the entire drive.

In step #209, control is performed so that the entire drive is stopped. In this processing, the entire drive of the actuator is stopped, and the microcomputer is set to a sleep (stop) mode. In addition, power supply to the image blur correction device is stopped. Then, when the camera main body 201 performs a certain operation, the camera main body 201 starts communication with the interchangeable lens 202. Thus, the sleep mode is released.

In the course of the process, if a request for serial communication interruption or a request for image blur correction interruption is issued from the camera main body 201, the interchangeable lens 202 performs the interruption processing.

In the serial communication interruption, communication data is decoded, and lens processing including, for example, aperture driving and focus-lens driving, is performed in accordance with a result of the decoding. On the basis of the decoding of the communication data, "SW1 ON", "SW2 ON", the shutter speed, the type of the camera main body 201, and the like can be determined.

In the image blur correction interruption, which is timer interruption occurring after certain intervals, image blur correction control in a pitch direction (vertical direction) and a yaw direction (horizontal direction) is performed.

The serial communication interruption will be described with reference to the flowchart shown in FIG. 6.

Figure 6:
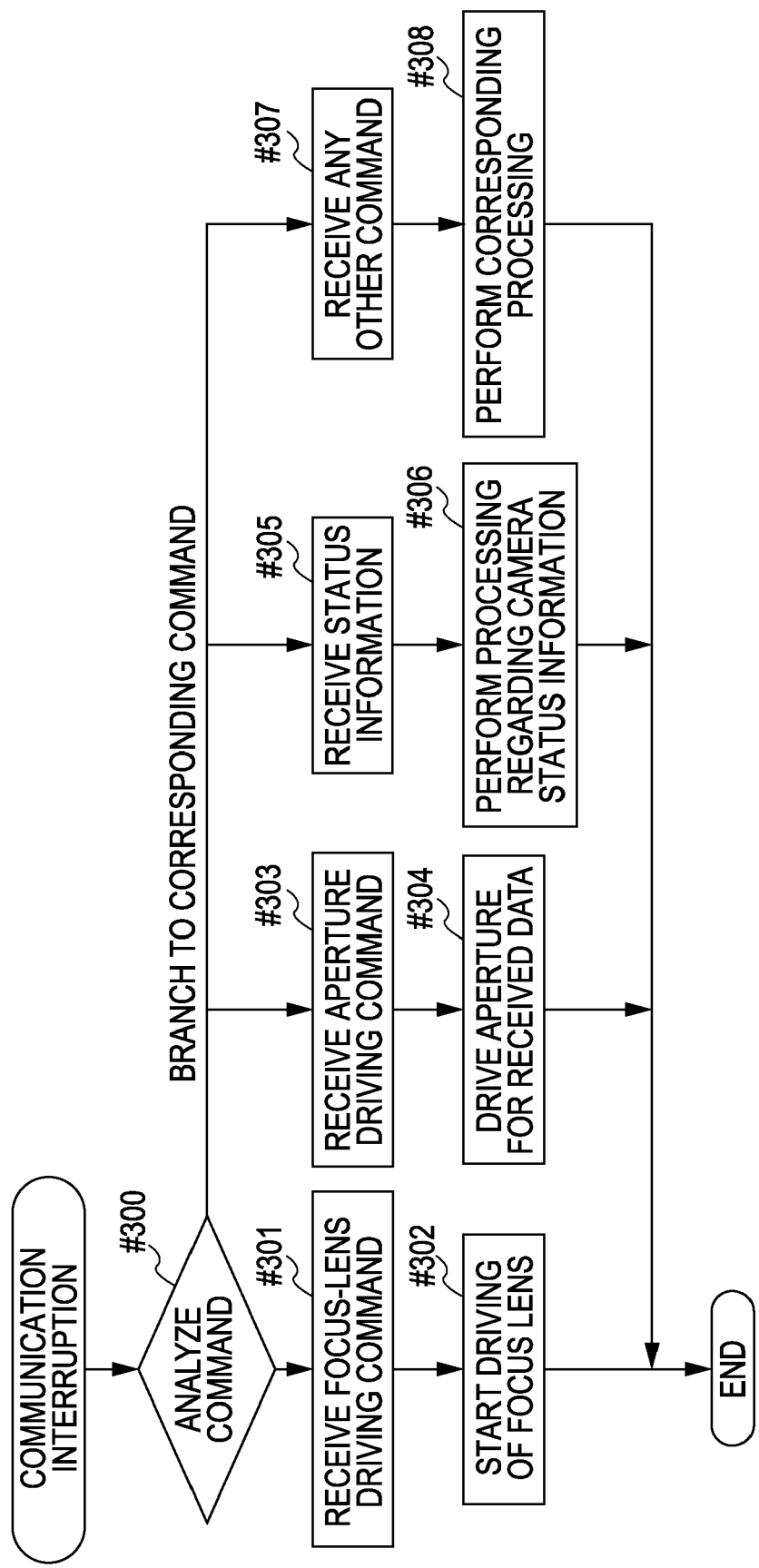
FIG. 6 is a flowchart showing a process performed by the interchangeable lens according to the embodiment of the present invention.

When the interchangeable lens 202 receives a communication from the camera main body 201, the process starts in step #300 of the flowchart shown in FIG. 6.

In step #300, a command received from the camera main body 201 is analyzed, and processing corresponding to the command is performed.

In step #301, a focus-lens driving command is received. In step #302, the speed of the focus-lens driving motor 230 is set in accordance with the target number of driving pulses, and driving of the focus lens 225 is started.

In step #303, an aperture driving command is received. Thus, the aperture 228 is driven on the basis of transmitted aperture driving data. In step #304, a driving pattern of the stepping motor 238 is set, the set driving pattern is output to the stepping motor 238 via the aperture control circuit 237, and the aperture 228 is driven.

In step #305, camera lens status communication is received. In step #306, information on the focal length of the interchangeable lens 202, information on the status of image stabilization, and the like are transmitted to the camera main body 201. In addition, information on the status of the camera main body 201 including, for example, the status of the release switch, the shooting mode, and the shutter speed is received.

In this processing, it is determined whether the camera main body 201 is in the shooting standby mode ("SW1 ON") or the camera main body 201 is performing an exposure operation ("SW2 ON"). Then, the characteristic of shake detection, which will be described later, is changed in accordance with a result of the determination.

In step #307, any other command, such as focus sensitivity data communication or optical data communication regarding the interchangeable lens 202, is received. In step #308, processing corresponding to the received command is performed.

The above-described image blur correction operation including shake detection is performed by the lens MPU 224.

A process of the image blur correction to be performed by the lens MPU 224 will be described with reference to the flowchart shown in FIG. 7.

Figure 7:
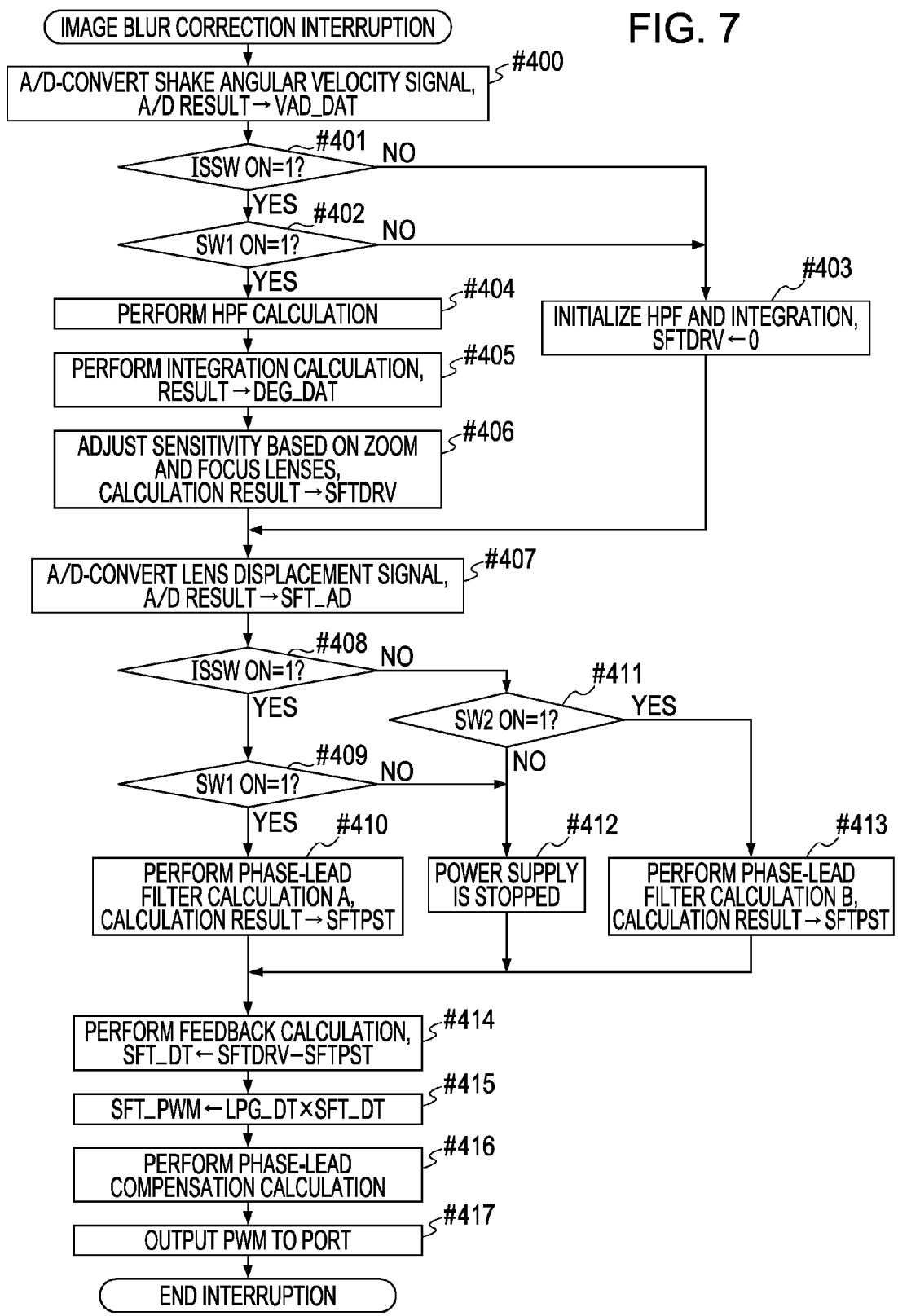
FIG. 7 is a flowchart showing a process of image blur correction according to the embodiment of the present invention.

When image blur correction interruption occurs in the course of the main process of the interchangeable lens 202, the lens MPU 224 starts control of image blur correction in step #400 of the flowchart shown in FIG. 7.

In step #400, a shake signal (angular velocity signal) detected by the angular velocity sensor 235 is analog-to-digital converted. A result of the analog-to-digital conversion is stored in a region of a random-access memory (RAM) (not shown) indicated by "VAD_DAT" within the lens MPU 224.

In step #401, it is determined whether "ISSW ON=1" is satisfied, that is, whether the image blur correction ON/OFF switch 239 is turned on. If it is determined that "ISSW ON=1" is satisfied, the process proceeds to step #402. If it is determined that "ISSW ON=1" is not satisfied, the process proceeds to step #403.

In step #402, it is determined whether "SW1 ON=1" is satisfied, that is, whether the release switch of the camera main body 201 is half-pressed and the camera main body 201 is set in the shooting standby mode. If it is determined that "SW1 ON=1" is satisfied, the process proceeds to step #404. If it is determined that "SW1 ON=1" is not satisfied, the process proceeds to step #403.

In step #403, since image blur correction is not to be performed, a high-pass filter is initialized and integration calculation is initialized. In step #403, correction lens driving target data SFTDRV is set to zero. Here, the image blur correction lens 227 is driven in accordance with a second driving characteristic in which a resonance amplitude, which is based on a spring constant in a case where a shock is applied to the optical apparatus, is reduced, and is fixed at a position aligned with the optical axis.

The first driving characteristic and the second driving characteristic are different from each other in terms of a frequency characteristic in the shake correction lens driving characteristic with respect to the frequency of shaking.

In step #404, high-pass filter calculation is performed. During a predetermined period of time from the start of image blur correction, the time constant is changed so that image shake at a rising edge can be reduced. Here, driving is carried out in accordance with the first driving characteristic, which is the characteristic of normal image blur correction.

In step #405, integration calculation is performed in accordance with a result of the high-pass filter calculation. A result of the integration calculation is stored in a region of the RAM indicated by "DEG_DAT" within the lens MPU 224. Here, "DEG_DAT" indicates a shake angular displacement signal.

In step #406, since the amount of eccentricity (sensitivity) of the image blur correction lens 227 for correcting the shake angular displacement DEG_DAT varies depending on the positions of the zoom lens 226 and the focus lens 225, the positions of the zoom lens 226 and the focus lens 225 are determined. More specifically, the positions of the zoom lens 226 and the focus lens 225 are divided into a plurality of zones. The average optical image shaking sensitivity (deg/mm) in each of the plurality of zones is read from table data, and the read average optical image shaking sensitivity is converted into correction lens driving data. A result of the calculation is stored in a region of the RAM indicated by "SFTDRV" within the lens MPU 224.

In step #407, a displacement signal of the image blur correction lens 227 is analog-to-digital converted, and a result of the analog-to-digital conversion is stored in a region of the RAM indicated by "SFT_AD" within the lens MPU 224.

In step #408, it is determined whether "ISSW ON=1" is satisfied, that is, whether the image blur correction ON/OFF switch 239 is turned on. If it is determined that "ISSW ON=1" is satisfied, the process proceeds to step #409. If it is determined that "ISSW ON=1" is not satisfied, the process proceeds to step #411.

In step #409, it is determined whether "SW1 ON=1" is satisfied, that is, whether the release switch of the camera main body 201 is half-pressed and the camera main body 201 is set in the shooting standby mode. If it is determined that "SW1 ON=1" is satisfied, the process proceeds to step #410. If it is determined that "SW1 ON=1" is not satisfied, the process proceeds to step #412.

In step #410, phase-lead filter calculation A is performed on the basis of a result SFT_AD of the analog-to-digital conversion of the shake correction lens displacement signal. A result of the calculation is stored in a region of the RAM indicated by "SFTPST" within the lens MPU 224.

In step #411, it is determined whether "SW2 ON=1" is satisfied, that is, whether the release switch of the camera main body 201 is fully pressed and the camera main body 201 is performing an exposure operation. If it is determined that "SW2 ON=1" is satisfied, the process proceeds to step #413. If it is determined that "SW2 ON=1" is not satisfied, the process proceeds to step #412.

In step #412, driving of the image blur correction lens 227 is stopped.

In step #413, phase-lead filter calculation B is performed on the basis of a result "SFT_AD" of the analog-to-digital conversion of the shake correction lens displacement signal. A result of the calculation is stored in a region of the RAM indicated by "SFTPST" within the lens MPU 224.

The processing of steps #408 to #413 will be described in more detail.

A case where it is determined in step #408 that the image blur correction ON/OFF switch 139 is turned on, it is determined in step #409 that the release switch of the camera main body 201 is half-pressed and the camera main body 201 is set in the shooting standby mode, and the process thus proceeds to step #410 will be described.

In step #410, image blur correction is performed in accordance with the shake signal detected in step #400. In this processing, by performing phase-lead filter calculation on the shake correction lens displacement signal, image blur correction with an increased damping can be performed. This processing is performed in order to reduce the influence of an unwanted resonance of a resilient member such as a spring in the above-described image blur correction mechanism. However, an increase in the damping causes the phase lag in image blur correction to be increased, and the performance of image blur correction is degraded. Thus, the phase-lead filter characteristic is determined in consideration of the balance between an increase in the damping and a reduction in unwanted resonances.

Next, a case where it is determined in step #408 that the image blur correction ON/OFF switch 239 is turned off, it is determined in step #411 that the release switch of the camera main body 201 is fully pressed and the camera main body 201 is performing an exposure operation, and the process thus proceeds to step #413 will be described.

In step #413, in accordance with the correction lens driving target data SFTDRV, which has been set to zero in step #403, the image blur correction lens 227 is driven. That is, the image blur correction lens 227 is electrically held in the vicinity of the optical axis. In this processing, by performing phase-lead filter calculation on the shake correction lens displacement signal, image blur correction with an increased damping can be performed. This processing is performed in order to reduce the influence of an unwanted resonance of a resilient member such as a spring in the above-described image blur correction mechanism.

However, since the image blur correction lens 227 is electrically held in the vicinity of the optical axis, it is unnecessary to take into consideration the phase lag in image blur correction, unlike the processing of step #410.

Thus, a phase-lead calculation characteristic B, which has a damping higher than that of a phase-lead calculation characteristic A employed in step #410, is employed in step #413, so that unwanted resonances can be further reduced.

In step #414, feedback calculation (SFTDRV−SFTPST) is performed. A result of the calculation is stored in a region of the RAM indicated by "SFT_DT" within the lens MPU 224.

In step #415, a loop gain "LPG_DT" is multiplied by the result "SFT_DT" obtained by the calculation performed in step #414. A result of the multiplication is stored in a region of the RAM indicated by "SFT_PWM" within the lens MPU 224.

In step #416, in order to achieve a stable control system, phase compensation calculation is performed.

In step #417, a result of the calculation performed in step #416 is output, as a pulse-width modulation (PWM) signal, to a port of the lens MPU 224. Then, image blur correction interruption ends.

The output is input to a driver circuit within the image blur correction control circuit 232. The image blur correction lens 227 is driven by the linear motor 233. Accordingly, image blur correction is performed.

As described above, in the processing of steps #408 to #410 of the flowchart shown in FIG. 7, in the case that the image blur correction ON/OFF switch 239 is turned on, the lens MPU 224 performs processing based on a phase-lead calculation characteristic in which the balance between the damping and the phase lag in image blur correction is taken into consideration. In the processing of step #413, since the image blur correction ON/OFF switch 239 is turned off, the image blur correction lens 227 is electrically held in the vicinity of the optical axis during an exposure operation. The image blur correction lens 227 is electrically held in the vicinity of the optical axis on the basis of a phase-lead filter characteristic having an increased damping.

With the above-described process, highly-accurate image blur correction can be achieved, without degrading the performance of image blur correction, while reducing the influence of an unwanted resonance of a spring in the image blur correction mechanism.

In addition, even in a case where an image blur correction operation is not selected, the influence of an unwanted resonance of a spring can be reduced.

Second Embodiment

A second embodiment of the present invention will be described with reference to the flowchart shown in FIG. 8.

Since the configuration of an optical apparatus according to this embodiment is similar to the configuration of the optical apparatus according to the first embodiment, the description of the configuration of the optical apparatus according to this embodiment will be omitted.

Figure 8:
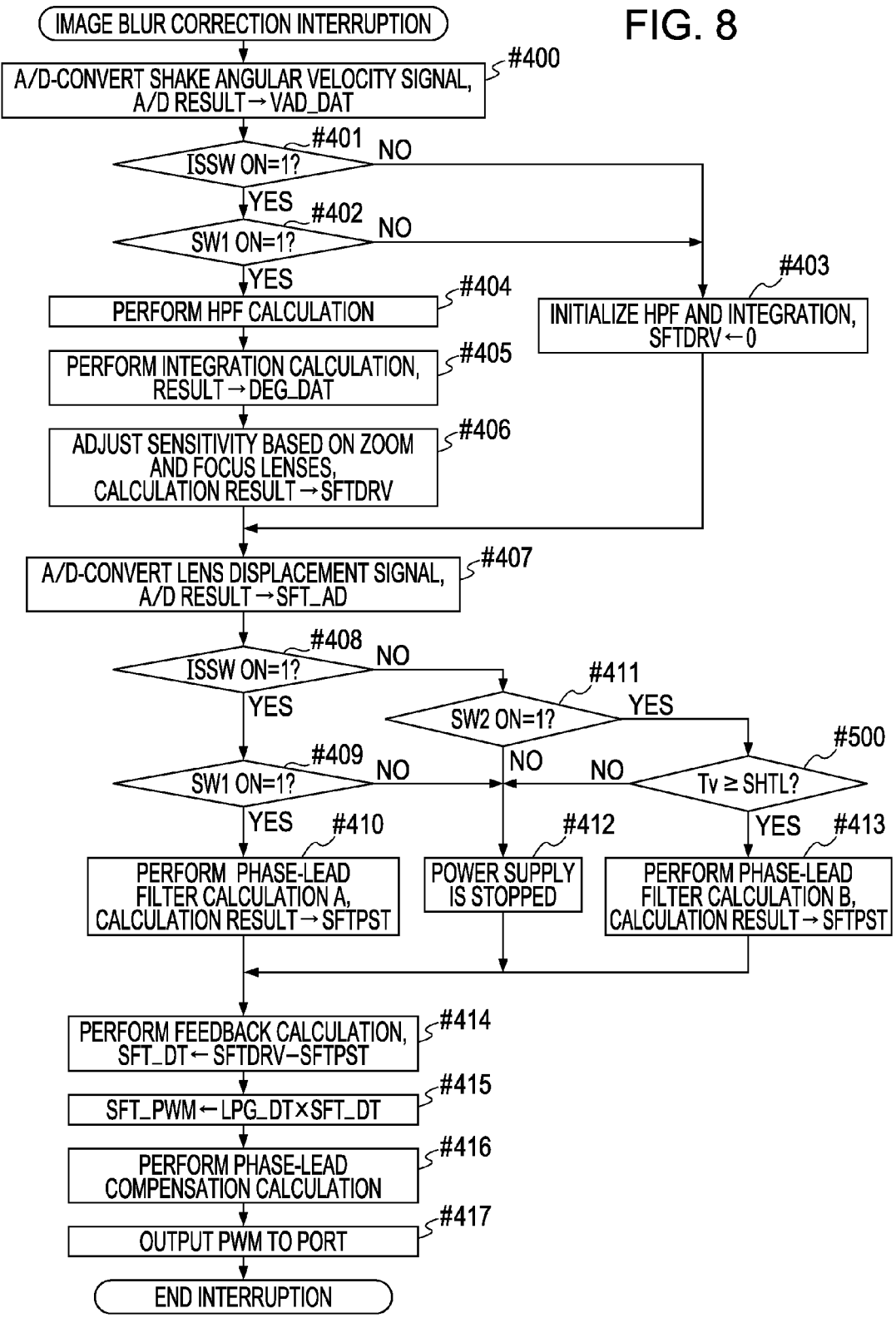
FIG. 8 is a flowchart showing a process of image blur correction according to another embodiment of the present invention.
Figure 9:
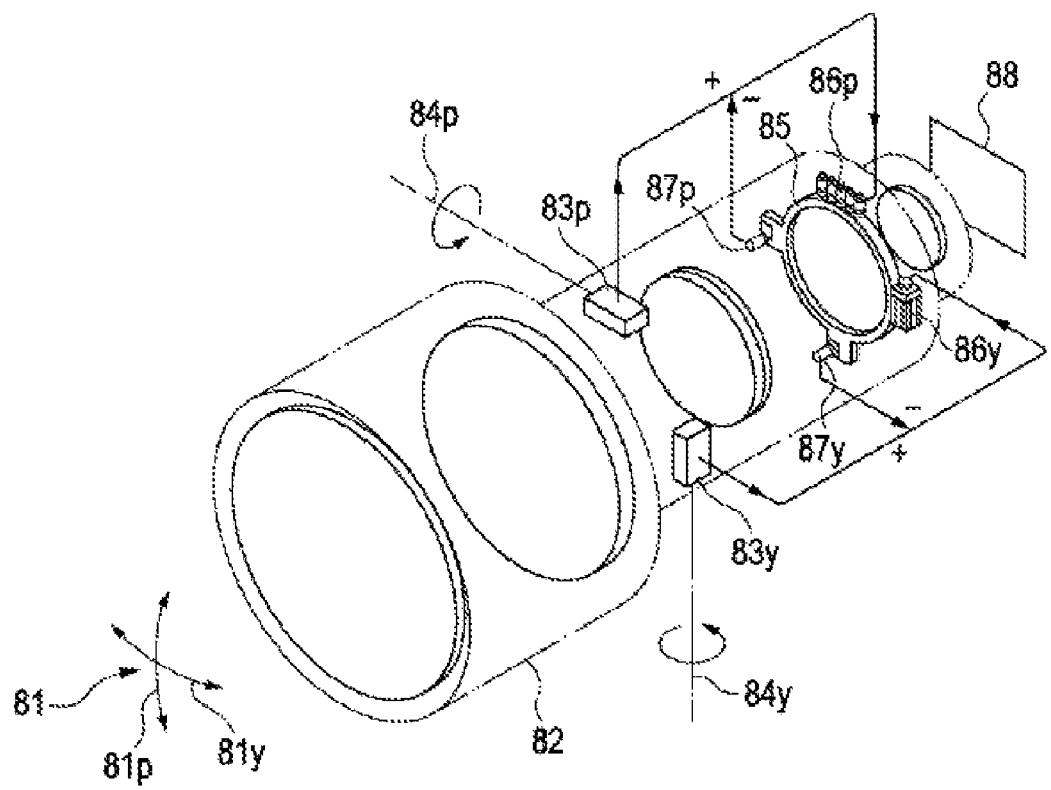
FIG. 9 illustrates an example of an image stabilization system of an image blur correction device.
Figure 10A:
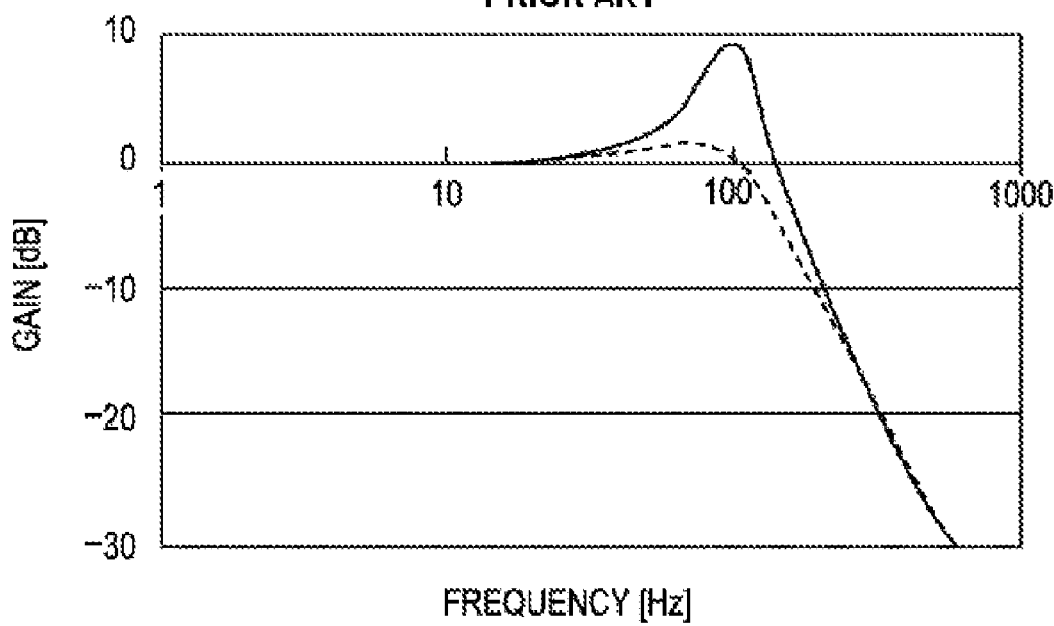
FIGS. 10A and 10B are Bode diagrams showing frequency characteristics of the image blur correction device.
Figure 10B:
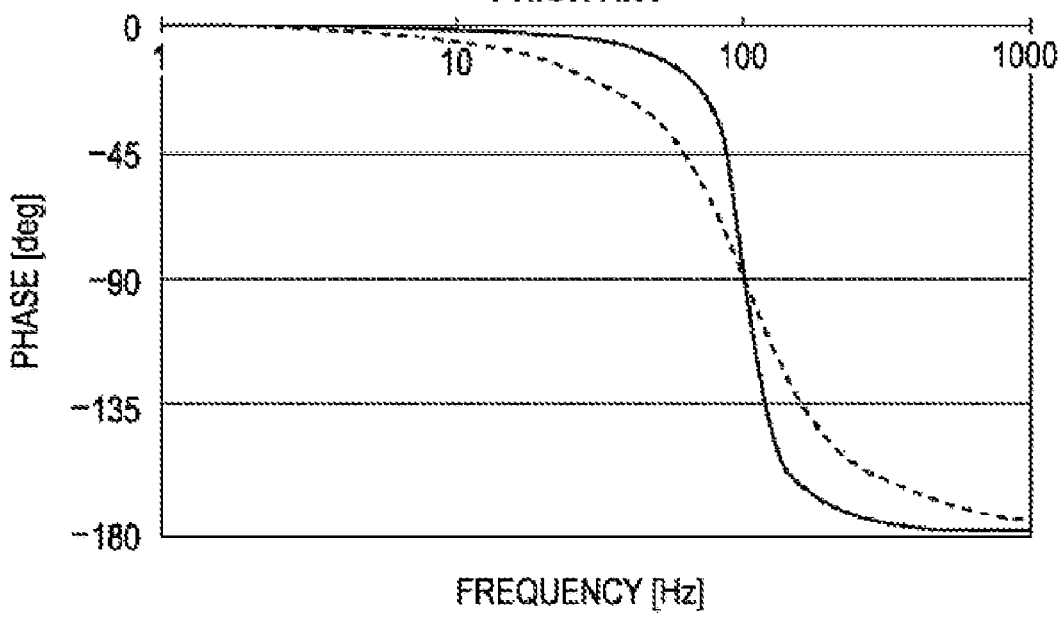

If it is determined in step #411 in the flowchart shown in FIG. 8 that "SW2 ON=1" is satisfied, that is, the release switch of the camera main body 201 is fully pressed and the camera main body 201 is performing an exposure operation, the process proceeds to step #500.

In step #500, it is determined whether the shutter speed Tv of the camera main body 201 is equal to or faster than a predetermined shutter speed SHTL. If it is determined that the shutter speed Tv of the camera main body 201 is equal to or faster than the predetermined shutter speed SHTL, the process proceeds to step #413. If it is determined that the shutter speed Tv of the camera main body 201 is slower than the predetermined shutter speed SHTL, the process proceeds to step #412. In step #413, as described above, phase-lead filter calculation B is performed. In this processing, the phase-lead calculation characteristic B, which has an increased damping so that an unwanted resonance can be further reduced, is employed, and the image blur correction lens 227 is electrically held in the vicinity of the optical axis. In step #412, since the shutter speed Tv of the camera main body 201 is slower than the predetermined shutter speed SHTL and the influence of an unwanted resonance is reduced, power supply to the image blur correction lens 227 is stopped in order to save electric power.

As described above, in the processing of steps #408 to #410 of the flowchart shown in FIG. 8, in the case that the image blur correction ON/OFF switch 239 is turned on, the lens MPU 224 performs processing based on a phase-lead calculation characteristic in which the balance between the damping and the phase lag in image blur correction is taken into consideration.

In the processing of steps #500 and #413, since the image blur correction ON/OFF switch 239 is turned off, if the shutter speed Tv of the camera main body 201 is equal to or faster than the predetermined shutter speed SHTL, the image blur correction lens 227 is electrically held in the vicinity of the optical axis during an exposure operation. The image blur correction lens 227 is electrically held in the vicinity of the optical axis on the basis of a phase-lead filter characteristic having an increased damping.

With the above-described process, highly-accurate image blur correction can be achieved, without degrading the performance of image blur correction, while reducing the influence of an unwanted resonance of a spring in the image blur correction mechanism. In addition, even in a case where an image blur correction operation is not selected, the influence of an unwanted resonance of a spring can be reduced. In addition, in the case of a shutter speed at which the influence of an unwanted resonance is small, power supply to the image blur correction lens 227 is stopped. Thus, the consumption of electric power can be reduced.

The exemplary embodiments of the present invention have been described above. Obviously, however, the present invention is not limited to the above-described embodiments. Various changes and modifications can be made to the present invention without departing from the scope of the present invention, which is defined by the claims.

An example in which a phase-lead filter characteristic is changed has been described above. However, for example, a loop gain may be changed or both a phase-lead filter characteristic and a loop gain may be changed.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-267996 filed Oct. 15, 2007, which is hereby incorporated by reference herein in its entirety.

What is claimed is:

1. An optical apparatus, comprising:
a camera configured to capture an object image;
a shake detection unit configured to detect shaking of the optical apparatus;
an image blur correction lens supported by resilient members;
a correction unit configured to drive the image blur correction lens based on a result of a detection performed by the shake detection unit and configured to correct image blur caused by shaking, wherein the correction unit performs phase-lead filter calculation on a signal based on an output from the shake detection unit;
a position detection unit configured to detect a position of the image blur correction lens; and
a selection unit configured to allow selection of whether performance of image blur correction by the correction unit is to be permitted or inhibited, wherein,
in a case where image blur correction is permitted, the correction unit drives the image blur correction lens using a first signal obtained by performing first phase-lead filter calculation on the signal based on the output from the shake detection unit, in accordance with a first driving characteristic that exhibits a first frequency characteristic, and,
in a case where image blur correction is inhibited, the correction unit electrically holds the image blur correction lens at a position aligned with an optical axis of the optical apparatus using a second signal obtained by performing second phase-lead filter calculation with a higher viscosity than the first phase-lead filter calculation on the signal based on the output from the shake detection unit, in accordance with a second driving characteristic that exhibits a second frequency characteristic, and
wherein the second driving characteristic is a characteristic in which a resonance amplitude, which is based on an elastic constant of the resilient members in a case where a shock is applied to the optical apparatus, is reduced more than the first driving characteristic.

2. The optical apparatus according to claim 1,
wherein, in a case where image blur correction is inhibited, the correction unit holds the image blur correction lens at the position aligned with the optical axis of the optical apparatus in accordance with the second driving characteristic during an exposure operation of the camera.

3. The optical apparatus according to claim 1,
wherein, in a case where image blur correction is inhibited, the correction unit holds the image blur correction lens at the position aligned with the optical axis of the optical apparatus in accordance with the second driving characteristic when a shutter speed of the camera is equal to or faster than a predetermined shutter speed.

4. The optical apparatus according to claim 3,
wherein, in a case where the selection unit selects inhibition of the performance of image blur correction and the shutter speed is slower than the predetermined shutter speed, power supply to the image blur correction lens is stopped.

5. The optical apparatus according to claim 1,
wherein the selection unit is a switch, and
wherein the switch is operated manually so that selection of whether performance of image blur correction by the correction unit is to be permitted or inhibited is allowed.

* * * * *